United States Patent Office 3,022,285
Patented Feb. 20, 1962

3,022,285
CARBOXYLATEVINYL AND CARBOXYVINYL ETHERS OF SUGARS AND METHOD OF PREPARATION
Lee A. Miller, Dayton, Ohio, assignor to Monsanto Chemical Company, St. Louis, Mo., a corporation of Delaware
No Drawing. Filed June 26, 1959, Ser. No. 822,989
15 Claims. (Cl. 260—209)

This invention relates to carboxylatevinyl and carboxyvinyl ethers of sugars, and to a method for preparing same, and more particularly to carboxylatevinyl and carboxyvinyl ethers of sugars prepared by the reaction of sugars with a strongly basic hydroxide and a propiolate.

New and useful compositions have been discovered which are carboxylatevinyl and carboxyvinyl ethers of sugars. These compositions are useful as biological toxicants, particularly fungicides, and as intermediates for the manufacture of detergents. These compositions are particularly unique in the presence of a vinyl group which provides reactive sites to allow the sugar composition to be substantially modified, as by cross-linking, or for other reactions associated with the vinyl unsaturation.

It is an object of this invention to provide new and useful compositions which are carboxyvinyl and carboxylatevinyl ethers of sugars.

It is another object of this invention to provide a method of making these new carboxyvinyl and carboxylatevinyl ethers of sugars.

These and other objects of the invention will become apparent as the detailed description of the invention proceeds.

By the method of the invention are made carboxyvinyl and carboxylatevinyl ethers of sugars such as monosaccharides—glucose, fructose, mannose, galactose, allose, altrose, talose, gulose, idose, ribose, arabinose, xylose, lyxose, thresose, erythrose; disaccharides—sucrose, lactose, maltrose, cellobiose; etc. The sugars specifically listed above exist in a number of different isomeric forms both cyclic and non-cylic, e.g., there is D-glucose, L-glucose, $\alpha$-D-glucose, $\beta$-D-glucose, etc. and the terms sugar, glucose, etc., are intended to cover sugar in its various isomeric forms. The most useful compositions of the invention will have from about 0.05 to about 3 carboxyvinyl or carboxylatevinyl units per sugar unit preferably from about 0.1 to about 1 unit per sugar unit.

The method of the invention involves the reaction of a sugar salt formed from a strongly basic hydroxide and a sugar, with a propiolate to form a carboxylatevinyl ether of a sugar. The desired product can also be made by reacting the sugar with an aqueous solution of a strongly basic hydroxide and a propiolate. It is preferred to react the propiolate with the sugar in the presence of a solvent and diluent for the propiolate which is not a solvent for the aqueous hydroxide to minimize hydrolysis of the propiolate to propiolic acid, and t-butanol or dioxane are quite satisfactory for this purpose. The free acid, i.e., the carboxyvinyl sugar ether is formed by acidification of the carboxylate.

The propiolates useful in the process of the invention are compounds of the formula R'C=CCOOR wherein R is an alkyl group having from 1 to 22 carbon atoms, preferably a lower alkyl group (1 to 6 carbon atoms), and R' is hydrogen or a hydrocarbon radical free of non-benzenoid unsaturation having from 1 to 6 carbon atoms. Non-benzenoid unsaturation is aliphatic or cycloaliphatic unsaturation as contrasted to benzenoid unsaturation which is aromatic unsaturation. An illustrative listing not meant to be limiting of suitable propiolates is as follows: methyl propiolate, ethyl propiolate, n-propyl isopropylpropiolate, isopropyl n-propylpropiolate, n-butyl t-butylpropiolate, isobutyl n-butylpropiolate, t-butyl n-butylpropiolate, n-amyl propiolate, n-hexyl n-amylpropiolate, n-hexyl n-hexylpropiolate, methyl phenylpropiolate, methyl cyclohexylpropiolate, n-heptyl propiolate, n-octyl propiolate, isooctyl propiolate, ethylhexyl propiolate, n-nonyl propiolate, n-decyl propiolate, tridecyl propiolate, pentadecyl propiolate, heptadecyl propiolate, eicosyl propiolate, docosyl propiolate, etc. Among some of the long chain esters it has not been specified whether they are straight chain or branched, but it is intended to cover both and mixtures thereof. The oxo proces which is well known produces mixtures of branched chain alcohols suitable for making these propiolates from propiolic acid or by ester exchange with short chain esters, and the straight chain alcohols useful for the same purpose are also well known.

It appears that the temperature of reaction is not critical in that the reaction will take place at room temperature (20°–25° C.) or lower on up to temperatures of about 100° C. or higher. Obviously a temperature will eventually be reached at which substantial decomposition of the reactants or products will occur, and it is desirable to operate the process below these temperatures.

For the strongly basic hydroxide there can be used any hydroxide of an alkali metal, such as sodium hydroxide, potassium hydroxide, lithium hydroxide, rubidium hydroxide or cesium hydroxide, preferably sodium potassium or lithium hydroxide, or a strongly basic quaternary ammonium hydroxide, such as benzyl trimethyl ammonium hydroxide, dibenzyl dimethyl ammonium hydroxide, or the like, or a mixture of such hydroxides. For optimum efficiency it is preferred to use these hydroxides in aqueous solutions in concentrations of from about 10% to about 40% preferably from about 20% to about 30%. The amount of hydroxide required is at least equivalent to the amount of propiolate which reacts with the sugar. Normally an excess of the hydroxide over and above this minimum amount will be used.

Normally it would be preferred to use an excess of propiolate over and above that necessary to produce the desired carboxylatevinylation, preferably from about 1 to about 5 units of propiolate are used per sugar unit depending on the amount of carboxylatevinylation that is desired. In cases where extremely small amounts of carboxylatevinylation are desired, e.g., of the order of 0.05 carboxylatevinyl units per sugar unit, smaller amounts of propiolate than 1 unit per sugar unit are used. After the hydroxide and propiolate have been reacted with the sugar, the carboxyvinyl sugare ether can be isolated, if desired, by neutralizing the alkaline mixture with a dilute acid, such as acetic, hydrochloric, or sulfuric, and the salts and excess acid can be removed by washing with methanol. The product can then be separated from the solvent, washed, and dried. Before neutralizing with acid the product is in the form of the basic carboxylate salt of the cation of the strongly basic hydroxide.

For some applications the product need not be thus isolated. It can often be used in the form of the reaction mixture. For other applications it may be desirable only to neutralize the excess base, or to merely wash the excess base from the carboxylate product.

The invention will be more clearly understood from the following detailed description of specific examples thereof:

*Example 1*

This example describes the preparation of a sodium carboxylatevinyl glucose ether. A mixture of 26 ml. of 40% aqueous sodium hydroxide and 200 ml. of t-butanol was added to a flask and formed two layers. Then 9.0 grams (0.05 mol) of glucose and 12.6 grams (0.15 mol) of methyl propiolate was added and the reaction mixture was stirred at reflux for 3 hours. After the 3 hour reaction period the reaction mixture was allowed to stand at room temperature over night and it separated into a lower dark brown layer and an upper pale green layer. The next day the upper t-butanol layer was decanted from the lower brown syrup layer. The syrup layer was washed with three 50 ml. portions of warm methanol. A brown semi-solid product was recovered, dried and infrared analysis of the product showed strong absorption in the 1580 cm.$^{-1}$ wave length indicating $-CO_2$ groups and a residue analysis showed 21.0% calculated as sodium.

Based on the residue determination it is calculated that the methyl propiolate treated glucose contains 2.3 sodium carboxylatevinyl units (or moles) per unit (or moles) of glucose.

To illustrate the reaction by equation, if it be assumed that instead of 2 to 3 sodium carboxylatevinyl units only 1 unit is added to the glucose, the equation for the reaction is as follows:

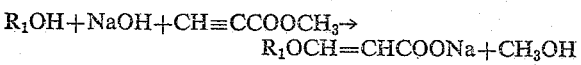

where $R_1$ is a glucose moiety and the OH attached to $R_1$ is of course one of the hydroxy groups in the glucose molecule.

*Example 2*

This example illustrates the testing of the product of Example 1 as a soil fungicide. In this test method naturally-infested soil fortified with fungi that incite root rots, stem cankers, seedling blights, and seed decay, is treated with a test chemical and incubated in a sealed container for a period of 24 hours. Seeds are sown in the treated soil which is then incubated at 70° F. for 48 hours before being removed to green house benches. Disease assessments are made two weeks later.

A uniform supply of infested soil containing the following organisms is prepared:

*Rhizoctonia solani*
*Fusarium oxysporum f. vasinfectum*
*Sclerotium rolfsii*
*Verticillium albo-atrum*
*Pythium ultimum*

A 6 milliter aliquot of a 1% stock solution of a test chemical is pipeted into a mason jar containing 600 grams of infested soil. This initial application rate is 100 p.p.m. or approximately 200 lbs. per 6-inch acre. The jar is sealed and the contents are thoroughly mixed by vigorous shaking. The treated soil is incubated at 25° C. for 24 hours and is transferred to 4-inch azalia pots. Fifteen cotton and cucumber seeds are sown in each pot. The seeded pots are then incubated at 70° F. and at a high relative humidity (96–98%) to insure activity of the organisms in the soil. Forty-eight hours later the pots are removed to the greenhouse where disease assessments are made two weeks later.

At 100 p.p.m. concentration the product of Example 1, i.e. the sodium carboxylatevinyl glucose ether in the soil fungicide test showed fair control of the fungus by comparison with the control, which of course, is indicative of no inhibition of the fungus growth.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the invention.

What is claimed is:

1. A method of making a carboxylatevinyl sugar ether comprising reacting a sugar salt of a hydroxide selected from the class consisting of alkali metal and quaternary ammonium hydroxides, with a propiolate of the formula R'C≡CCOOR wherein R is an alkyl group having from 1 to 22 carbon atoms and R' is selected from the class consisting of hydrogen and hydrocarbon radicals free of non-benzenoid unsaturation having from 1 to 6 carbon atoms, to form a carboxylatevinyl ether of a sugar.

2. The method of claim 1, wherein said salt is an alkali metal salt.

3. The method of claim 1, wherein R' is hydrogen.

4. The method of claim 1, wherein R' is hydrogen, R is methyl and said salt is an alkali metal sugar salt.

5. A method of making a carboxylatevinyl sugar ether comprising reacting a sugar with an aqueous solution of a hydroxide selected from the class consisting of alkali metal and quaternary ammonium hydroxides, and a propiolate of the formula R'C≡CCOOR wherein R is an alkyl group having from 1 to 22 carbon atoms and R' is selected from the class consisting of hydrogen and hydrocarbon radicals free of non-benzenoid unsaturation having from 1 to 6 carbon atoms, in the presence of a solvent for the propiolate, the amount of hydroxide being at least equivalent to the amount of propiolate which reacts with the sugar.

6. The method of claim 5, wherein t-butanol is added as a solvent for the propiolate in the reaction.

7. The method of claim 5, wherein said hydroxide is an alkali metal hydroxide.

8. The method of claim 5, wherein R' is hydrogen.

9. The method of claim 5, wherein t-butanol is added as a solvent for the propiolate in the reaction, R' is hydrogen, R is methyl and said hydroxide is an alkali metal hydroxide.

10. The method of claim 9, wherein said sugar is glucose.

11. An alkali metal carboxylatevinyl sugar ether.
12. A sodium carboxylatevinyl sugar ether.
13. A carboxyvinyl sugar ether.
14. An alkali metal carboxylatevinyl glucose ether.
15. A sodium carboxylatevinyl glucose ether.

References Cited in the file of this patent

UNITED STATES PATENTS

| | | |
|---|---|---|
| 2,157,347 | Reppe et al. | May 9, 1939 |
| 2,671,779 | Gaver et al. | Mar. 9, 1954 |

UNITED STATES PATENT OFFICE
CERTIFICATE OF CORRECTION

Patent No. 3,022,285            February 20, 1962

Lee A. Miller

It is hereby certified that error appears in the above numbered patent requiring correction and that the said Letters Patent should read as corrected below.

Column 1, line 63, for "R'C=CCOOR" read -- R'C≡CCOOR --; column 2, line 50, for "sugare" read -- sugar --.

Signed and sealed this 23rd day of July 1963.

(SEAL)
Attest:

ERNEST W. SWIDER            DAVID L. LADD
Attesting Officer            Commissioner of Patents